United States Patent
Yamaguchi et al.

(10) Patent No.: US 8,637,140 B2
(45) Date of Patent: Jan. 28, 2014

(54) METHOD FOR DEFINING AN ELECTRICALLY CONDUCTIVE METAL STRUCTURE ON A THREE-DIMENSIONAL ELEMENT AND A DEVICE MADE FROM THE METHOD

(75) Inventors: James Yamaguchi, Laguna Niguel, CA (US); W. Eric Boyd, La Mesa, CA (US)

(73) Assignee: ISCS Inc., Costa Mesa, CA (US)

( * ) Notice: Subject to any disclaimer, the term of this patent is extended or adjusted under 35 U.S.C. 154(b) by 13 days.

(21) Appl. No.: 13/267,651

(22) Filed: Oct. 6, 2011

(65) Prior Publication Data

US 2012/0094092 A1    Apr. 19, 2012

Related U.S. Application Data

(60) Provisional application No. 61/455,125, filed on Oct. 13, 2010.

(51) Int. Cl.
*B32B 3/00* (2006.01)
*G03F 7/20* (2006.01)

(52) U.S. Cl.
USPC .......................................... 428/210; 430/311

(58) Field of Classification Search
USPC ................ 430/311, 313, 318; 428/210, 195.1
See application file for complete search history.

(56) References Cited

U.S. PATENT DOCUMENTS

| | | | |
|---|---|---|---|
| 2006/0017049 A1* | 1/2006 | Pilla | 257/10 |
| 2007/0154845 A1* | 7/2007 | Shin et al. | 430/311 |
| 2010/0255426 A1* | 10/2010 | Jain et al. | 430/322 |
| 2011/0239763 A1* | 10/2011 | Shkel et al. | 73/504.13 |

* cited by examiner

*Primary Examiner* — Brittany Raymond
(74) *Attorney, Agent, or Firm* — W. Eric Boyd, Esq.

(57) ABSTRACT

A method for defining an electrically conductive metalized structure, which may comprise an electrode or trace, on the surface of a three-dimensional element. The three-dimensional element may comprise a glass microsphere or shell resonator. A laser direct write grayscale photolithographic process is used in conjunction with electrically conductive metal deposition processes to define one or more electrically conductive metal structures on the surfaces of the three dimensional element.

5 Claims, 1 Drawing Sheet

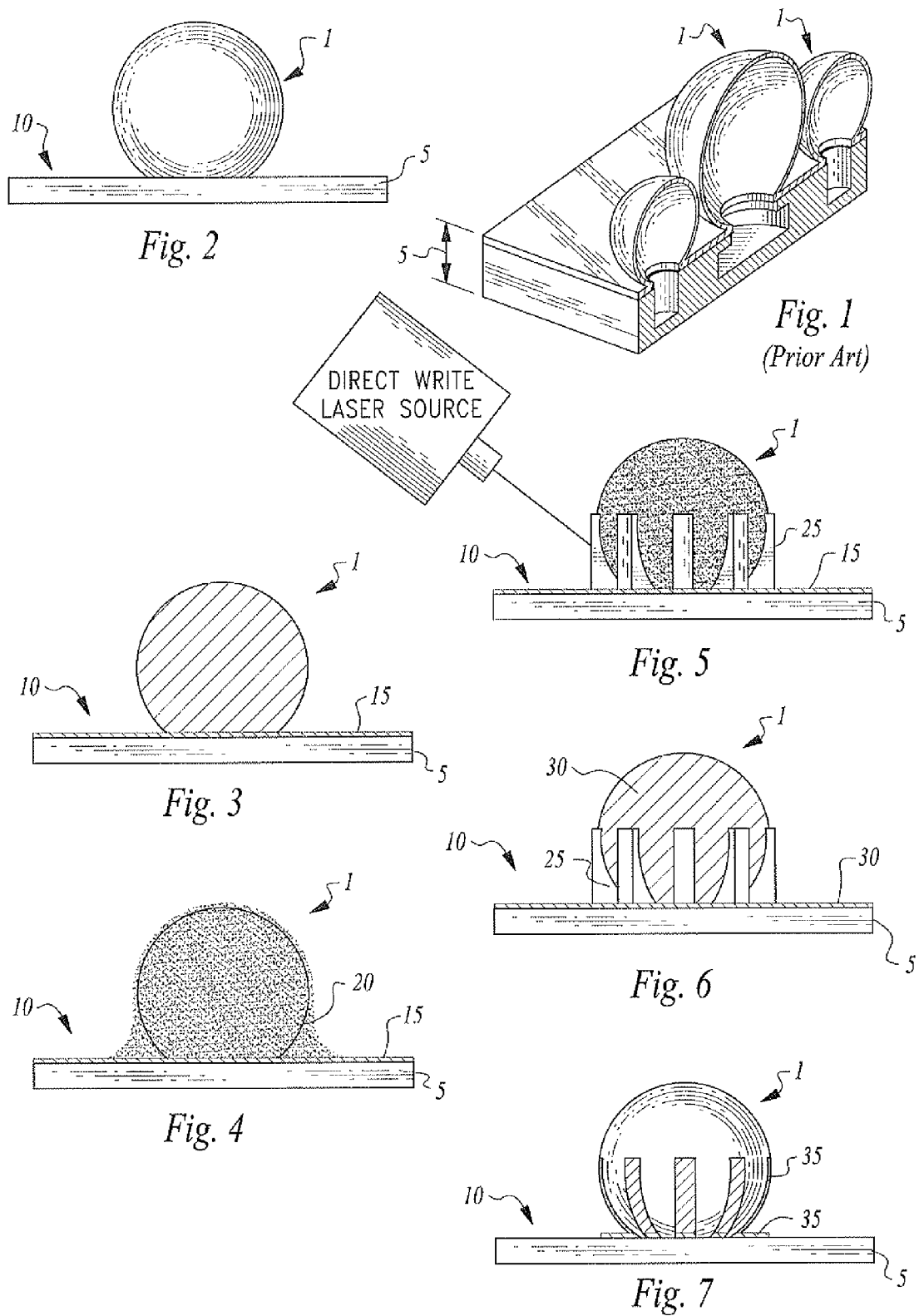

METHOD FOR DEFINING AN ELECTRICALLY CONDUCTIVE METAL STRUCTURE ON A THREE-DIMENSIONAL ELEMENT AND A DEVICE MADE FROM THE METHOD

CROSS-REFERENCE TO RELATED APPLICATIONS

This application claims the benefit of U.S. Provisional Patent Application No. 61/455,125, filed on Oct. 13, 2010 entitled "Method for Feature Metalization of Spherical Surfaces and a Device Made from the Method" pursuant to 35 USC 119, which application is incorporated fully herein by reference.

STATEMENT REGARDING FEDERALLY SPONSORED RESEARCH AND DEVELOPMENT

N/A

BACKGROUND OF THE INVENTION

1. Field of the Invention

The invention relates generally to the field of photolithographic technologies used in electronic fabrications processes.

More specifically, the invention relates to a method for defining an electrically conductive metal structure on a three-dimensional element which, in one embodiment, may comprise defining an electrically conductive metallic trace, pattern, electrode or other structure on the surface of a glass microsphere or spherical shell resonator.

The invention further relates to a device made from the method of the invention.

2. Description of the Related Art

Three-dimensional micro-machined structures comprising spherical, semi-spherical or hemi-spherical glass structures have application in signal processing, frequency and timing control and inertial measurement. An example of prior art glass structures, which are referred to as "shell resonators" in literature, is found in "3D Micromachined Spherical Shell Resonators With Integrated Electromagnetic and Electrostatic Transducers", Zotov et al., Solid State Sensors, Actuators and Microsystems Workshop (Jun. 6-10, 2010), the entirety of which is incorporated herein by reference.

The dimensions of a glass shell resonator structure may be quite small, in the range of 1 mm diameter or less, and the shell material may be comprised of a glass material such as Corning Pyrex 7740 that is formed using a wafer-scale glass-blowing process. A prior art process for fabricating glass shell resonator structures is disclosed in "Method and Apparatus of Wafer-Level Micro-Glass-Blowing), U.S. Pat. No. 7,694,531 to Eklund, et al., the entirety of which is incorporated herein by reference.

In one application, glass shell resonator structures having electrically conductive metal traces or structures disposed on the surfaces thereof, oscillate in a vibratory mode at resonance by means of an excitation frequency. Depending on the sensor application of the resonators, changes in resistance, magnetic characteristics, capacitance or other physical characteristic of the trace, traces or between adjacent traces on adjacent shell resonator structures are measured and used to sense acceleration, frequency change, temperature change, rotation and the like.

Because shell resonator structures have relatively small feature sizes and radial and non-planar surfaces, defining the electrical conductive metal traces or electrodes on the surface of the structure is challenging.

Prior art attempts include defining metal traces on a flat glass layer in a Pyrex-Si wafer stack prior to forming the resonator structures in a high temperature thermal process but difficulty in devising a metal stack with sufficient ductility to permit plastic deformation concurrent with the formation of the glass shell structure requires complex, costly, multiple plating steps, each of which introduces a potential for lower yields.

What is needed is a method for providing metal traces or structures on a three-dimensional structure such as a shell resonator structure that is reliable, precise and relatively simple.

BRIEF SUMMARY OF THE INVENTION

The invention is a method for defining an electrically conductive metalized structure, which may comprise an electrode or trace, on the surface of a three-dimensional element. The three-dimensional element may comprise a glass microsphere or shell resonator.

In a first aspect of the invention, a method is disclosed for defining an electrically conductive metal structure on a three-dimensional element comprising the steps of providing a substrate comprising a first surface where the first surface comprises a three-dimensional element, and, defining an electrically conductive metal structure having a predetermined geometry and a predetermined set of material properties on a predetermined portion of the three-dimensional structure using a maskless photolithographic process.

In a second aspect of the method, the maskless photolithographic process comprises the use of an intensity-modulated laser in a grayscale photolithographic process.

In a third aspect of the invention, the substrate comprises a silicon layer.

In a fourth aspect of the invention, the three-dimensional element is a resonator element.

In a fifth aspect of the invention, the three-dimensional element is a glass shell resonator element formed using a wafer-scale glass-blowing process.

In a sixth aspect of the invention the electrically conductive metal structure is in electrical communication with an electrically conductive region disposed on the surface of the substrate.

In a seventh aspect of the invention, a method for defining an electrically conductive metal structure on a three-dimensional element is disclosed comprising the steps of providing a substrate comprising a first surface where the first surface comprises a three-dimensional element, defining a metal layer having a predetermined set of material properties on at least a portion of the first surface and on at least a portion of the surface of the three-dimensional element, defining a photoresist layer over the metal layer on at least a portion of the first surface and on at least a portion of the surface of the three-dimensional element, exposing a predetermined pattern in the photoresist layer using a maskless photolithographic process whereby a predetermined portion of the pattern is disposed on the first surface and a predetermined portion of the pattern is disposed on the three-dimensional structure, developing the image to define one or more photoresist structures and one or more exposed metal layer areas on the first surface and on the three-dimensional element, and removing the exposed metal layer areas to define an electrically conductive metal structure on the first surface and on the three-dimensional structure.

In an eighth aspect of the invention, a three-dimensional element having an electrically conductive metal structure disposed thereon is disclosed and is prepared by a process comprising the steps of providing a substrate comprising a first surface where the first surface comprises a three-dimensional element, defining a metal layer having a predetermined set of material properties on at least a portion of the first surface and on at least a portion of the surface of the three-dimensional element, defining a photoresist layer over the metal layer on at least a portion of the first surface and on at least a portion of the surface of the three-dimensional element, exposing a predetermined pattern in the photoresist layer using a maskless photolithographic process whereby a predetermined portion of the pattern is disposed on the first surface and a predetermined portion of the pattern is disposed on the three-dimensional structure, developing the image to define one or more photoresist structures and one or more exposed metal layer areas on the first surface and on the three-dimensional element, and removing the exposed metal layer areas to define an electrically conductive metal structure on the first surface and on the three-dimensional structure.

These and various additional aspects, embodiments and advantages of the present invention will become immediately apparent to those of ordinary skill in the art upon review of the Detailed Description and any claims to follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

BRIEF DESCRIPTION OF THE SEVERAL VIEWS OF THE DRAWINGS

FIG. 1 depicts a plurality of three-dimensional structures in the form of prior art glass shell resonator structures.

FIG. 2 depicts a side view of a single three-dimensional structure disposed on the surface of a substrate.

FIG. 3 depicts the deposition of a metal layer on the three-dimensional structure and the substrate.

FIG. 4 depicts the deposition of a photoresist layer on the three-dimensional structure and the first surface of the substrate.

FIG. 5 depicts the patterning of the photoresist layer of FIG. 4 using a maskless laser direct write grayscale photolithographic process.

FIG. 6 depicts the three-dimensional structure and the substrate of FIG. 5 after developing.

FIG. 7 depicts the three-dimensional structure and the substrate of FIG. 6 after photoresist stripping with a plurality of electrically conductive metal structures remaining on the surfaces thereof.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE INVENTION

Turning now to the figures wherein like numerals define like elements among the several views, a method for defining a electrically conductive metalized structure, which may comprise an electrode or trace, on the surface of a three-dimensional element and a method for making the same is disclosed.

With respect to FIG. 1, a plurality of three-dimensional elements 1 are depicted. The illustrated three-dimensional elements 1 depict a plurality of prior art glass microspheres for use as glass shell resonator elements such as disclosed in U.S. Pat. No. 7,694,531, supra.

Three-dimensional elements 1 are disposed on substrate 5 which substrate material may comprise a silicon material or a glass material or both, such as in a Pyrex-Si wafer stack. The substrate comprises a first surface 10.

FIG. 2 illustrates a side view of an exemplar three-dimensional structure 1 in the form of a glass shell resonator structure disposed on first surface 10.

As depicted in FIG. 3, a metal layer 15 is deposited on at least a portion the first surface 10 and at least a portion of the surface of three-dimensional element 1 as is known in the plating and photolithographic arts. Metal layer 15 may comprise a gold material. Multiple layers of different metals in multiple deposition steps may be used in the process of the invention but in the preferred embodiment, a single metal layer 15 is deposited.

Metal layer 15 may have a set of predetermined material properties, that is, be a material selected based on a desired predetermined set of mechanical, physical or electrical or other material characteristics, or any combination thereof, based on the end application of the device (e.g., its use as a capacitive, inductive, thermal or resistive sensor element or device). Metal layer 15 may be relatively thick, as it is put down as a field metal versus a pattern lift-off structure and, in the preferred embodiment, is less than 10 microns in thickness. Metal layer 15 may be comprised of a gold, copper, nickel, or other plating or deposition material having suitable electrical and etching properties.

A photoresist layer 20 is deposited on at least a portion of three-dimensional element 1 and, in an alternative embodiment, on at least a portion of the first surface 10 as is depicted in FIG. 4. After application, photoresist layer 20 may be semi-hardened or "soft-baked" per the manufacturer specifications for same. Depending on the photolithographic method and materials selected, the photoresist material may be a positive photoresist material or a negative photoresist material and, in one embodiment, uses AZ 4620 photoresist material available from Clariant Corporation.

As depicted in the preferred embodiment of the process of the invention in FIG. 5, a predetermined pattern or image is exposed, i.e., imaged into photoresist layer 20 using a maskless photolithographic process whereby a predetermined portion of the imaged pattern is disposed on the first surface 10 and a predetermined portion of the pattern is disposed on the three-dimensional structure. The pattern may have a predetermined geometry.

The maskless photolithographic process is preferably a laser direct write grayscale photolithographic process that permits the formation of three-dimensional lithographic photoresist structures 25 and relies on varying or modulating the exposure source intensity, typically a laser source, to achieve the three-dimensional photoresist structures.

Maskless grayscale photolithography desirably permits the fabrication of three-dimensional microstructures within a relatively thick layer of photoresist. Using the preferred grayscale process, photoresist layer 20 is applied to substrate 5 using spray-on or spin-on coating and may be several hundreds of microns thick.

An intensity-modulated laser source next exposes predetermined patterns in photoresist layer 20, leaving three-dimensional photoresist structures 25 in the layer after the development process.

In contrast to prior art two-dimensional photoresist patterning which leaves the photoresist layer either completely exposed or completely unexposed, laser direct write grayscale photolithography is a maskless process and scans a modulated laser source across the photoresist The photolithographic process is capable of partially exposing the photoresist, thus referred to as grayscale, and is capable of producing photoresist features with multilevel surfaces.

A suitable grayscale system for use in the process steps of the invention is available from Heidelberg Instruments, specifically the Model DWL66 Laser Lithography System.

Turning to FIG. 6, the imaged pattern is developed to create a plurality of photoresist structures 25 over predetermined portions of metal layer 15 on the first surface 10 and, in the illustrated embodiment, on the surface of the three-dimensional structure 1. The development step further defines one or more exposed metal layer areas 30 on first surface 10 and three-dimensional element 1.

Exposed metal layer areas 30 are defined where photoresist structures 25 are not present and are etched away in a metal etching operation leaving the unexposed metal layer 15 portions under photoresist structures 25 intact.

As seen in FIG. 7, remaining photoresist structures 25 are stripped in a photolithographic process from first surface 10 and three-dimensional element 1 to define an electrically conductive metal structure 35 on first surface 10 and on three-dimensional structure 1 which can function as an electrode or electrically conductive structure for use in a sensor device or assembly.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A spherical element having an electrically conductive metal structure disposed thereon prepared by a process comprising the steps of:
   providing a substrate comprising a first surface comprising a planar portion and a spherical element,
   defining a continuous metal layer upon and in contact with a surface of the planar portion and with a surface of the spherical element,
   defining a continuous photoresist layer over the metal layer,
   defining a solid three-dimensional photoresist structure in the photoresist layer that is in contact with the metal layer on the spherical element and that is in contact with the metal layer on the planar portion,
   exposing a continuous metal layer area that is in contact with the spherical element and with the planar portion,
   removing the exposed continuous metal layer area,
   removing the solid three-dimensional photoresist structure to define a continuous electrically conductive metal structure that is disposed on and in contact with the surface of the planar portion and disposed on and in contact with the surface of the spherical element.

2. The device of claim 1 where in a maskless photolithographic process defines the solid three-dimensional photoresist structure and comprises the use of an intensity modulated laser in a grayscale photolithographic process.

3. The device of claim 1 wherein the substrate comprises a silicon layer.

4. The device of claim 1 wherein the spherical element is a resonator element.

5. The device of claim 1 wherein the spherical element is a glass shell resonator element formed using a wafer scale glass blowing process.

* * * * *